Dec. 25, 1956 J. A. CARVER ET AL 2,775,543
LIQUID-LIQUID CONTACTING TOWER
Filed Sept. 30, 1953
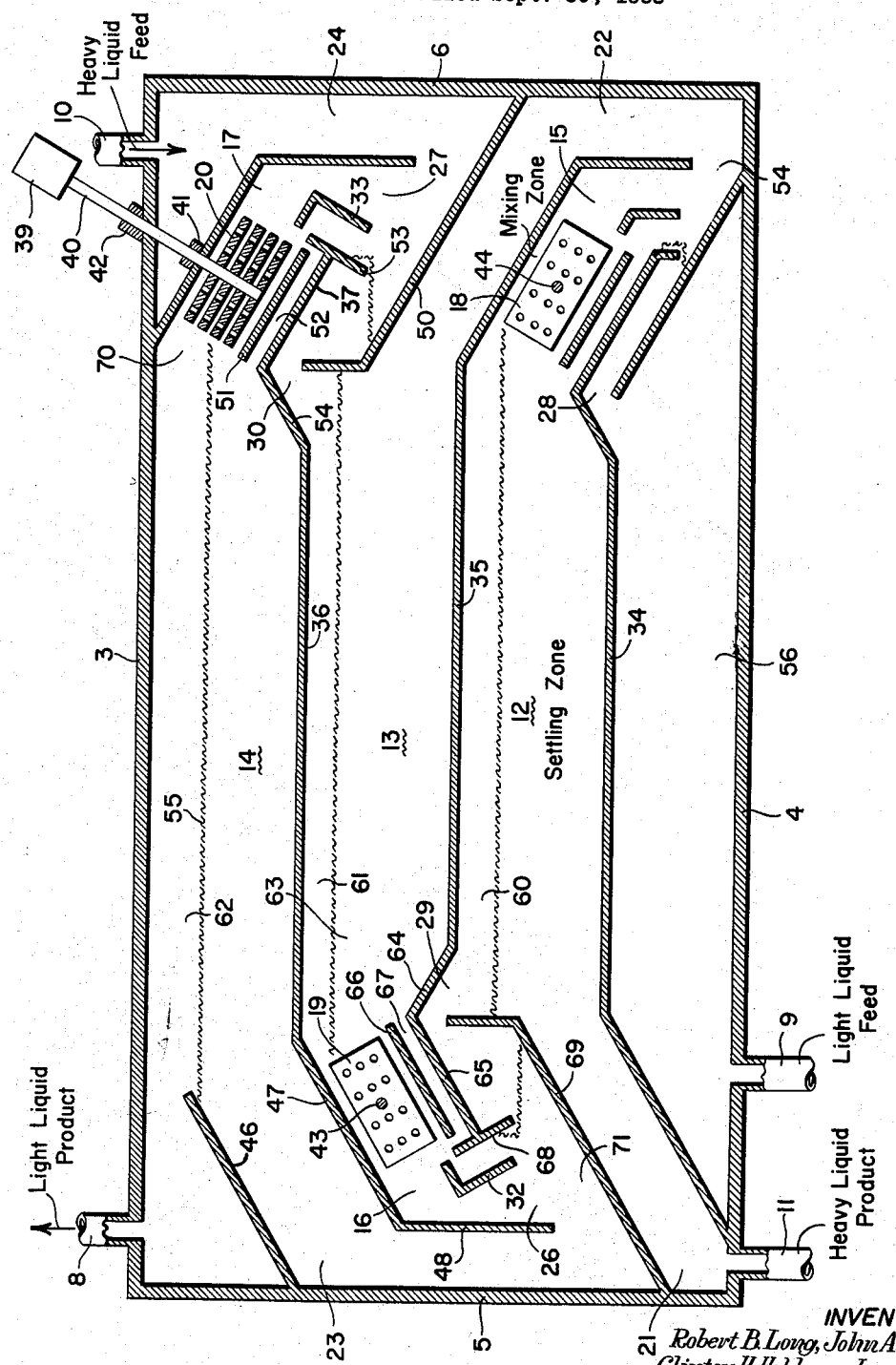
INVENTORS
Robert B. Long, John A. Carver,
Clinton H. Holder and James R. Felix
BY
W. N. Wright ATTORNEY

United States Patent Office 2,775,543
Patented Dec. 25, 1956

2,775,543

LIQUID-LIQUID CONTACTING TOWER

Robert B. Long, Wanamassa, John A. Carver, Scotch Plains, Clinton H. Holder, Westfield, and James R. Felix, Plainfield, N. J., assignors to Esso Research and Engineering Company, a corporation of Delaware Application September 30, 1953, Serial No. 383,291

6 Claims. (Cl. 196—14.52)

The present invention relates to an improved process and apparatus for the countercurrent contacting of two incompletely miscible liquids having different densities. The invention has particular application in the field of liquid-liquid extraction where a first liquid is contacted with a second liquid for the purpose of removing desirable or undesirable constituents from one of the liquids. In accordance with the present invention a novel contacting stage construction is employed in a vertical tower or vessel which is characterized by providing a combination of concurrent and cross-current mixing and concurrent settling in each stage throughout the tower.

The invention is directed broadly to processes in which liquids are treated by selective solvent action or to chemical reactions involving mixing. At the present time there are a great many chemical processes in which a selective solvent is used to treat a particular liquid in order to secure a partial segregation, or removal of chemical constituents from the liquid. For example, petroleum oils are conventionally treated with solvents such as liquid sulfur dioxide, phenol, cresol, nitrobenzene, furfural, aniline, ether and other solvents or mixtures of such solvents. Use of these solvents with a petroleum lubricating oil is particularly made to remove low viscosity index constituents from the oil and thereby obtain a treated oil having an improved viscosity index. More generally, such solvent treating processes are employed to selectively remove undesired constituents from the liquid being treated with the solvent or in some cases to recover desired constituents.

In solvent treating operations of the general character described above, many modifications are used to control the solvent extraction process as desired; for example, auxiliary solvents or modifying agents may be injected into the treating system. Again, a wide range of temperature and pressure conditions may be employed in particular types of solvent extractions. The present invention, however, is not concerned with these types of modifications or refinements. Instead, it is concerned with a basic method and apparatus used for contacting liquids whatever the particular system may be. It is, therefore, to be understood that this invention is of application to any liquid-liquid contacting system with any of the modifications that may be employed in such processes.

Many methods have been devised for the contacting of liquids. However, it has been found more advantageous to effect large volume interfluid treating in contacting towers rather than in mixers and settlers, centrifuges, etc. Processing in towers is more advantageous from an economic viewpoint because of the lower initial and operating costs. Consequently, considerable attention has been given to the apparatus required for efficient liquid-liquid contacting in towers. The towers which have been employed have been of many different designs—some employing various types of packing materials, others employing orifice plates, and others employing a wide variety of internal baffles.

In analyzing the mechanism required in liquid-liquid contacting it is apparent that two basic steps are involved. These are efficient mixing of the liquids followed by efficient separation of the mixed liquids. Thus, in extraction towers having a given number of stages, for the best overall results it is necessary that each stage provide good mixing and also good settling. Only by achieving both of these desiderata in such a tower is it possible to secure treating effects that are equivalent to a large number of theoretical stages. It is, therefore, a particular object of this invention to provide a type of apparatus which will more effectively be capable of adequately mixing and thoroughly settling liquid phases passing through each stage.

In order to secure efficient mixing and settling of the liquids it is necessary to consider the basic physical and/or chemical properties of the liquids insofar as their mixing and settling characteristics are concerned. Thus, particular liquids such as phenol and oil may be very readily mixed and when mixed may be difficult to separate. Alternatively, other types of liquids such as water and oil, for example, may be difficult to mix but may be readily separated. Because of these factors, it is generally necessary to critically design and operate a particular extraction tower to secure the optimum treatment of liquids having particular mixing and settling characteristics. It is, therefore, another object of this invention to provide a contacting tower which is flexible in that it will provide an optimum balance between a high degree of mixing and rapid settling at all parts of the tower independently of the physical characteristics of the liquids and independently of the flow rates used in the operation or process.

At the present time two general types of liquid-liquid contacting towers are employed. A first type utilizes packing such as Raschig rings, Berl saddles, wire mesh, etc. to obtain contact between two liquids; and a second type employs metal plates that are provided with small perforations. The plates of the latter type of tower are generally referred to as dispersion plates since the liquids being contacted are dispersed one in the other by jetting one or both of them through perforations that are provided in the plates. Thus, each of the perforations behaves as an orifice.

Both the packed contacting towers and the dispersion plate towers derive the energy required to mix the two liquids primarily from the differential pressure energy that exists between the static heads of the two liquid phases that are present. In this connection, it will be noted that one liquid is generally present within a liquid-liquid contacting tower as a continuous liquid phase, while the other liquid is present in the form of a non-continuous or dispersed phase. The latter liquid may be either heavier or lighter than the continuous phase liquid.

In a conventional packed tower operating in a proper manner, the dispersed phase liquid flows in a film and as drops over the packing and mass transfer between the two phases occurs across the dispersed phase film and drop surface. The efficiency of the mass transfer effect and the overall contacting efficiency of packed towers is generally satisfactory at certain conditions of flow rate. However, the mixing realized in packed towers is a function of flow rate and therefore efficiency varies markedly with flow rate. This is particulraly true for large towers where channeling is very apt to occur. Hence, packed towers are not particularly desirable for use in commercial scale operations where the diameters of the towers are usually quite large.

In towers employing dispersion plates wherein one liquid phase is jetted into the other liquid phase, more consistent performance is obtained for both large and small towers than is true with packed towers. However, dispersion plate towers suffer from other shortcomings. In the first place, the pressure energy that is utilized in forming the surface of dispersed liquid is normally a very small portion of the total pressure energy available. Much of the remaining energy is dissipated in random swirl and eddy motions which do not contribute to mass transfer. Furthermore, most dispersion plates possess fixed dispersion areas, and the depth of dispersed liquid adjacent these plates varies over wide limits with changes in dispersed phase flow rates and physical properties. Also, dispersion plates with fixed hole areas provide no means for varying the degree of mixing with changes from plate to plate in the physical properties of the continuous and dispersed phases. Thus, definite limitations on the flexibility of dispersion plate towers exist with regard to both operating efficiency and hydraulic stability.

Accordingly, it is an object of the present invention to overcome the deficiencies described above that are associated with the packed and dispersion-plate types of liquid-liquid contacting towers. More particularly, it is an object of the present invention to provide liquid-liquid contacting apparatus which is characterized by high capacity, high contacting efficiency, effective mixing and rapid settling. It is a further object to provide a liquid-liquid contacting apparatus which possesses good hydraulic stability within the contacting vessel.

The term "hydraulic stability" as used herein refers to the ability of liquid-liquid contacting apparatus to function properly over a wide range of liquid flow rates and continuous and dispersed phase physical properties without the occurrence of by-passing of the individual contact stages by one or both of the liquids. Hydraulic stability as such is particularly important in dispersion plate towers, where it is general practice to maintain a layer of the dispersed phase liquid immediately adjacent the surface of each plate. Each such layer serves to prevent the continuous phase liquid from by-passing from the entrance end of one stage to the exit end of the following stage and also to generate the head required to jet the dispersed phase liquid through the perforations in the plate. The perforations are therefore carefully sized so that under normal conditions a layer of the dispersed phase liquid will exist on one side of each dispersion plate. It will be appreciated that the operation of such a tower may readily be upset by changes in the flow rates or physical properties of the liquids being contacted, since these changes may result in the loss of the aforementioned layers or the layers may become deep enough to cause the liquid forming the layers to bypass the stages.

Insofar as hydraulic stability is concerned, it is an object of the present invention to provide an apparatus that possesses improved characteristics in this respect. More particularly, it is an object of the present invention to provide a liquid seal between each pair of contacting stages in a liquid-liquid contacting tower so as to prevent bypassing of the stages by the liquids. The apparatus features for providing such liquid seals are additionally characterized by being self-adjusting in that the liquid seals are continuously maintained over a wide range of tower operating conditions. The seals are also especially characterized by being substantially insensitive to changes in the flow rates or physical properties of the flowing phases.

The term "plate efficiency," or "actual stage efficiency," as used herein is a measure of contacting efficiency and numerically is equal to the percentage of the degree of contacting that is realized in a single batch stage mixer and settler under equilibrium conditions. Thus, one theoretical stage is established by contacting two liquids intimately to equilibrium in a batch mixer followed by a thorough settling in a batch settler. As stated, therefore, conventional plate or packed liquid contacting towers, due to their actual stage efficiencies of usually less than about 50%, substantially require a number of plates exceeding by a factor of 2 the number of theoretical contacting stages that would be required. It is thus clearly of the greatest importance to improve the stage efficiency of a contacting tower in order to decrease the expense of the contacting and also the size of the tower. In this connection, it is a principal object of the present invention to provide an improved type of extraction tower in which stage efficiencies up to 90% may be obtained and in which efficiency can be controlled at any desired level up to this efficiency regardless of the flow rates or the physical properties of the phases.

It is a further object to provide a liquid-liquid contacting stage for an extraction tower wherein the stage provides much more rapid settling that is possible in conventional forms of such apparatus.

The manner in which the above-indicated objectives of this invention may be obtained will be understood from a consideration of the following description which is drawn with reference to the accompanying figure. This figure represents a diagrammatic cross-section view taken in elevation of a liquid-liquid extraction tower embodying the principles of this invention.

Referring to the figure which depicts one embodiment of the present invention, the apparatus illustrated therein comprises a vessel 5 which is adapted to contain liquids. Vessel 5 may be cylindrical, cubical, or any suitable volumetric type of structure; but for the purposes of the present description, it will be assumed that the vessel is cylindrical. Thus, vessel 5 includes a top plate 3 which is sealed to the side walls 6 which in turn are sealed to a bottom plate 4. The vessel as shown is adapted to contact two incompletely miscible liquids having different densities in which the heavy liquid constitutes a continuous liquid phase throughout the apparatus and the lighter liquid constitutes the discontinuous phase. Accordingly, vessel 5 is provided with conduit 9 which pierces the bottom plate 4 and serves as a feed conduit for the light, discontinuous phase liquid. Conduit 8 piercing the top plate 3 serves as an exit for the treated light liquid. Similarly, conduit 10 piercing top plate 3 and conduit 11 piercing bottom plate 4 serve as the inlet and outlet conduits respectively for the heavy, continuous phase liquid.

The interior of vessel 5 is divided into superposed contacting stages 60, 61, and 62 by substantially horizontal imperforate plates 34, 35, and 36. At this point in the description it will be noted that the peripheral edges of these plates as well as all of the other plates and baffles shown in the figure (except vibrating plate assemblies 18, 19, and 20) are sealed to the walls 6 of vessel 5 except as shown. For example, the periphery of plate 36 is sealed continuously to the interior wall surfaces of vessel 5 except for those parts of its periphery that intersect and are sealed to plates 47 and 54. In other words, this plate as well as the other plates and baffles extend in a direction perpendicular to the plane of the figure to the walls 6 of vessel 5 and are sealed thereto.

Each contacting stage in vessel 5 includes a mixing zone and a settling zone. Thus, contacting stage 60 contains mixing zone 15 and settling zone 12; stage 61 contains mixing zone 16 and settling zone 13; and stage 62 contains mixing zone 17 and settling zone 14. The settling zones are confined and bounded by the interior surfaces of vessel 5 and also by the horizontal plates 34, 35 and 36. Thus, settling zone 13 is bounded on the top by plate 36, on the bottom by plate 35 and on its sides by the walls 6 of vessel 5.

The entrance to settling zone 13 may consist of a venturi-like section 63 which is formed by plate 36, the walls 6 of vessel 5, and angularly inclined plate 64. It will be noted that venturi section 63 connects mixing zone 16 with settling zone 13 and that its area in cross-section expands in passing from the former zone to the latter zone. This feature of the present stage construction is preferred since it has been found that much more rapid separations are realized thereby. Section 63 prevents eddy currents generated within mixing zone 16 from being transmitted any substantial distance into the settling zone 13. This section performs most satisfactorily when the angle which plate 64 forms with plate 35 is between about 110 and 150° (e. g. about 20–60 degrees from the horizontal. A particularly preferred angle is about 25–35 degrees from the horizontal.

The angular disposition of mixing zone 16 is desirable since it makes possible cross-current mixing of the two liquids admitted to the zone as well as countercurrent mixing. It is preferred that zone 16 be at an angle of about 20–60 degrees from the horizontal and especially about 25–35 degrees. Mixing is accomplished by a mechanical mixer. This may be of a rotary type such as a simple turbine or propellor designed not to pump the phases through the unit. However, a preferred mechanical mixer is a set of perforated vibrating plates 19 which are secured to shaft 43 and which vibrate in a plane that is substantially perpendicular to the direction of liquid flow. These plates are preferably of a type described in a co-pending patent application entitled "Liquid-Liquid Contacting Method and Apparatus," Serial No. 75,904, filed February 11, 1949, by Fenske et al., now U. S. Patent No. 2,667,407. The characteristics and operation of these plates are dealt with at length in that patent application, and it is therefore considered that a detailed account of them is not required in the present description.

It will be realized that the vibrating plate mixers may be positioned within the mixing zones in various ways. For example, they may be arranged with the individual plates being vertically disposed and parallel to one another as shown by assembly 19 in the figure. Or they may be arranged so that the individual plates lie substantially in the same plane as the stream of liquid that is passing through them as for example in a manner similar to plate assembly 20 in mixing zone 17. In any event, the flat portions of the plates should move in a direction that is perpendicular to the direction of flow of the liquid.

Referring specifically to plate assembly 20 it will be noted that shaft 40 to which the individual plates are attached passes through sealing devices 41 and 42 and extends out through vessel 5 to a power source 39. This power source may be of any conventional type that is suitable for imparting a vibrating motion to the perforated plate assembly 20. In addition, power source 39 may be actuated hydraulically, electrically, magnetically, pneumatically, etc.

While the construction and the operation of plate assemblies 18, 19, and 20 are described at length in the Fenske et al. Patent No. 2,667,407, it has been found in the present apparatus that the frequency of reciprocation of these plate assemblies may be varied from about 100 to 1000 cycles per minute with a stroke or amplitude of vibration from about 0.5" to 2" in magnitude. The perforations in the individual plates may be from about 0.25" to 2" in diameter, and the total area of the perforations in each plate may constitute from 10 to 50% of the total area of the plate. It is also preferred that the plates be spaced from one another a distance of about ½ to 6 inches. It will be appreciated that more than one set of plates may be employed in each mixing zone. In any event, it is preferred that the plates extend substantially from wall to wall in each mixing zone, thereby making certain that all of the liquid material passing through each mixing zone is agitated by the plates.

It will further be appreciated that the actuating shaft of each plate assembly may be brought out through the walls 6 of vessel 5 in a variety of ways. For example, shaft 40 pierces top plate 3 of vessel 5 in an angular manner while horizontally disposed shafts 43 and 44 of plate assemblies 19 and 18, respectively, may pass through the walls 6 of vessel 5 to suitable power sources not shown in the figure.

An angularly inclined baffle plate such as baffle plate 66 is preferably included in each mixing zone. This baffle plate is positioned between and spaced from the plate assembly 19 and the angularly inclined baffle plate 65. Thus, plate 66 forms a conduit 67 with plate 65 and the walls 6 of vessel 5. Conduit 67 is adapted to convey continuous phase liquid from the exit end of the mixing zone back to the entrance end. The purpose of baffle plate 66 and conduit 67 is to provide for recirculation of the continuous phase liquid through the mixing zone 16, thus improving the contacting efficiency of this zone. This provision has been found to provide a recirculation flow rate that is estimated to be from about 2 to 5 times the flow rate of the continuous phase feed to the zone.

Conduit 26 is a substantially vertical conduit adapted to convey the dispersed phase liquid and the continuous phase liquid to the entrance of mixing zone 16. Conduit 26 is substantially an integral part of mixing zone 16, but for the sake of description it will be assumed to be a separate conduit. This conduit as shown is confined by the walls 6 of vessel 5, vertical plate 48 which is sealed to plate 47, and plate 68 which is sealed to plate 65. The lower edges of plate 48 and 68 extend into a liquid trap chamber 71. This chamber has a bottom plate member 69 which extends angularly inward from the walls 6 of vessel 5 to a point that is inward of and also vertically above the lower edges of plates 48 and 68. Thus, plate 69 in conjunction with plates 68, 65, and 64 forms a trap 29 through which the dispersed phase liquid must flow to enter trap chamber 71.

The overlap between the upper edge of plate 69 and the lower edge of plate 68 forms a seal on the light discontinuous phase which provides self-adjusting phase interface control within stage 60. Thus, the present apparatus not only traps both phases but also provides for an oil layer depth of several inches under the tray to allow good settling of heavy phase droplets from the light phase.

Conduit 23 formed and laterally bounded by the walls 6 of vessel 5, angularly inclined plates 46 and 47, and vertical plate 48 serves to conduct continuous phase liquid into trap member 71 and thence into mixing zone 16. This liquid is prevented from by-passing mixing zone 16 by the aforementioned trap 29 of dispersed phase liquid. The dispersed phase liquid in turn is prevented from rising through conduit 23 and by-passing mixing zone 16 by the fact that plate 48 extends downwardly beyond plate 68.

It is apparent that concurrent mixing within mixing zone 16 is bound to occur because of the fact that the dispersed phase liquid and the continuous phase liquid both flow through this zone in the same direction. Cross-current mixing, perpendicular to the net flow direction also occurs at least partially because of the reciprocating motion of perforated plate assembly 19. The perforations in the individual plates of plate assembly 19 act as orifices. On one stroke of assembly 19, continuous and dispersed phase liquid are forced through the perforations in one direction; and on the return stroke of assembly 19, the flow direction of the phases is reversed. Cross-current mixing also takes place within the mixing zone by virtue of the fact that the heavy liquid tends to move downwardly at right angles to the net flow direction as well as longitudinally through the mixing zone, while the light liquid tends also to move upwardly at right angles to the net flow direction as well as longitudinally through the zone.

It is apparent that if dispersed phase liquid flowing into conduit 26 enters plate assembly 19 at the underside of plate 47, less efficient mixing will be obtained since this dispersed liquid will bypass a large part of plate assembly 19. This by-passing is prevented by baffle plate 32 which is adapted to direct (1) light, dispersed phase liquid into the bottom portion of the entrance to mixing zone 16 and (2) the heavy, continuous phase liquid into the upper or top portion of the entrance to this same zone. The baffle plate 32 also imparts the initial cross-current mixing pattern to the phases entering mixing zone 16.

Having described one structural embodiment of the present invention it is felt that a description of the manner in which the apparatus may be operated will serve to better illustrate the nature of the present invention. Accordingly, by referring to the figure it will be seen that a heavy liquid feed constituting a continuous liquid phase throughout the apparatus flows into vessel 5 through conduit 10. From this point the heavy liquid flows vertically downward through conduit 24 into trap member 50 where its direction of flow is reversed. It then flows upwardly through conduit 27 and is diverted into the upper section of the entrance to mixing zone 17 by baffle plate 33. Simultaneously, dispersed phase liquid enters conduit 27 by passing through trap 30 into trap element 50 and around plate 53 into conduit 27. Here the dispersed phase liquid is directed by baffle plate 33 into the lower section of the entrance to mixing zone 17.

The dispersed phase liquid and the continuous phase liquid are concurrently and cross-currently mixed within zone 17 to a great extent by the agitation developed by vibrating plate assembly 20. The resulting mixture then discharges through venturi section 70 into settling zone 14 where the individual liquids separate into distinct phase layers.

A portion of the heavy, continuous phase liquid recycles to the entrance of mixing zone 17 by passage through conduit 52 formed by walls 6 and plates 51 and 37. The remainder of the heavy, continuous phase liquid passes laterally across plate 36 and then flows through conduit 23 into the entrance of stage 61. The light, discontinuous phase liquid existing above phase interface 55 flows laterally through zone 14 to conduit 8 whence it is discharged from vessel 5. The position of interface 55 may be regulated in any conventional manner as by means of a suitable liquid level controller.

The heavy, continuous phase liquid continues through vessel 5 by passing through mixing zone 16 and settling zone 13 of stage 61 and then through conduit 22 into stage 60. Here it again mixes with dispersed phase liquid in mixing zone 15, separates from the latter liquid in settling zone 12 and then leaves vessel 5 by flowing downwardly through conduits 21 and 11.

The light, dispersed phase liquid enters vessel 5 through conduit 9, flows laterally through section 56, trap 28, trap member 54, and then enters mixing zone 15 in a manner similar to that described earlier herein. From this point it flows through settling zone 12 of stage 60 and enters mixing zone 16 of stage 61 after passing through trap 29 which seals the continuous phase liquid in stage 60 from the continuous phase liquid within trap member 71. The dispersed phase liquid flows in a similar manner through stages 61 and 62 and finally leaves vessel 5 through conduit 8 as described earlier.

An important feature of the present invention concerns the continuous maintenance of liquid seals between the individual contacting stages such as seal 29. This seal prevents the continuous phase liquid from by-passing mixing zone 16, and it also continuously and automatically maintains a layer of dispersed phase liquid immediately below horizontal plate 35. The existence of this layer insures the existence of a differential static head pressure between the two liquid phases which is required for the satisfactory operation of the apparatus and the process. In this connection, it is preferred that the interface position be such that about the lower two-thirds of the settling zone 12 be filled with continuous phase liquid and that the upper one-third of the zone be filled with non-continuous phase liquid. It is apparent that such a condition may be readily met by properly positioning the lower edge of plate 68 and the upper edge of plate 69. It will be further appreciated that the lower edge of plate 68 in reality behaves as a weir under which the dispersed phase liquid must flow. And in this connection, it is particularly preferred that the lower edge of plate 68 be serrated to provide a notched type of weir. The serrations or notches serve to distribute the discontinuous phase liquid equally across the entrance to mixing zone 16 by breaking up this particular stream of liquid into a plurality of smaller streams. The V-notch type of serrated weir is especially attractive for this purpose. The notches should be sufficient in number, width and depth to accommodate the largest flow rates that are contemplated for the discontinuous phase liquid. In any event, the tops of the notches should be kept vertically below the upper edge of plate 69.

The apparatus and process described above have been evaluated by contacting two liquids that are incompletely miscible and which possess different densities. The two liquids chosen for this evaluation were water and a solution of phenol in kerosene. The kerosene contained from 0.3 to 2.5 wt. percent of phenol.

The evaluation of the present invention was carried out in an apparatus which was substantially identical to the apparatus illustrated in the figure accompanying the present description. The apparatus consisted of three contacting stages stacked one above the other so that phase flow between the stages was by gravity head. The phases were passed countercurrently between the stages but cocurrently through each stage. The mixing zone in each stage was tilted at an angle of about 30 degrees from the horizontal so that the flow through these zones was cross-current as well as cocurrent. Each contacting stage contained a separate mixing zone and a separate settling zone which were connected by means of a venturi type section that expanded from the outlet of the mixing zone to the inlet of the settling zone. Each mixing zone contained a vibrating plate type of mechanical mixer.

Each stage of the apparatus had a tray height of about 2 feet, a tray width of about 6 inches, and a length of about 15 feet. Thus, each tray resembled a vertical section from a tower substantially 15 feet in diameter.

The perforated plate mixers each consisted of four perforated parallel plates which were reciprocated as a unit by means of a hydraulic motor. The amplitude of vibration of the plates could be varied to a maximum of about 1½" and the frequency of vibration to a maximum of about 600 cycles per minute. The mixer plates, spaced 4" apart, were 5½" wide by 18" long and contained 150 ½" holes. The perforations in each plate therefore constituted about 30% of the area of the plate.

Each settling zone was provided with two wire screen baffles which extended from the bottom of the zone to the top of the zone and were positioned substantially at right angles to the direction of liquid flow through the zones. These baffles served as settling aids; but they are not a critical feature of the present invention, however, their use for this purpose being well known in the art. Each settling zone was about 2' high, 6" wide and 7' long. Each venturi section expanded at an angle of about 30°.

The water component of the liquid system tested served as the continuous liquid phase in the apparatus, and the kerosene-phenol solution served as the discontinuous liquid phase. Thus, the water entered the test apparatus at the top of the apparatus and flowed down through the apparatus from stage to stage as a continuous phase. The kerosene-phenol solution, on the other hand, entered the apparatus at a point near the bottom and flowed upward through the apparatus until it was discharged through a valve provided in the top of the apparatus.

A phase interface was maintained near the top of the apparatus and also beneath each of the transverse plates that served to divide the apparatus into the three stages.

The phase interface at the top of the column (i. e., the top settling zone) was maintained by means of a pressure actuated valve positioned in the kerosene withdrawal line. This valve was set so as to maintain a constant pressure slightly above atmospheric pressure.

The phase interfaces on the other stages were controlled by means of underflow serrated weirs of the type described hereinbefore. Each of the weirs was 6 inches wide and was positioned vertically within each contacting stage so as to maintain a layer of kerosene within each settling zone that constituted about 1/3 of the height of the zone. In other words, the oil layer was about 8 inches deep. The weirs were of the V-notch type, each notch being 1" wide at its base and 1" deep.

The inclined baffle plate in each mixing zone formed a recycle conduit about 3" x 6½" x 18" long.

The kerosene-phenol solution and the water were fed to the apparatus by means of conventional piping, pumps, etc. Once in the apparatus, however, the flow through each of the contacting stages was governed substantially entirely by the difference in the densities that exist between these two materials. Test runs were made with flow rates of 15 and 45 gallons per minute of the kerosene solution and 15 and 45 gallons per minute of water supplied to the apparatus in various combinations.

The streams issuing from the apparatus were sampled and analyzed for their phenol contents by the application of a conventional ultra-violet spectrophotometer.

In the case of the water samples the ultra-violet absorption was determined directly and compared with the absorption obtained with a known standard of phenol and water. The kerosene samples were extracted with caustic to remove the phenol. The phenol-caustic solution was then compared with known phenol-caustic solutions.

The results obtained in this manner were then compared to the results that are obtained in batch mixers and settlers where the liquids contacted are allowed to reach equilibrium conditions before analyses are performed on them. The contacting efficiency of the present apparatus was then considered as being numerically equal to the percentage of eqilibrium that was attained in the batch apparatus.

The mixing intensity in each mixing zone was varied from run to run in order to determine the best conditions to be employed for this particular liquid combination. The following data were obtained:

*Table I*

| Run No | 1 | 2 | 3 | 4 | 5 | 6 | 7 |
|---|---|---|---|---|---|---|---|
| Kerosene, Gal./Min | 30 | 15 | 15 | 15 | 45 | 45 | 15 |
| Water, Gal./Min | 30 | 15 | 15 | 15 | 45 | 15 | 45 |
| Mixer Agitation: | | | | | | | |
| Frequency, R. P. M. (F) | 0 | 200 | 450 | 500 | 450 | 450 | 400 |
| Amplitude, inches/stroke (A) | 0 | 0.5 | 0.5 | 0.5 | 0.5 | 0.5 | 0.5 |
| Mixing Intensity, (F)×(A) | 0 | 100 | 225 | 250 | 225 | 225 | 200 |
| Efficiency, Percent | 13 | 40 | 78 | 88 | 70 | 92 | 65 |

It is apparent from the results presented in this table that the present apparatus and process are capable of providing contacting efficiencies that are far superior to the efficiencies that characterize the presently available forms of liquid-liquid contacting types of apparatus. It will be particularly noted that the contacting efficiency in the apparatus under study was especially high when the mixing plates were vibrated at amplitudes and frequencies giving a mixing intensity of 225 to 250 inches/minute and that the contacting efficiency was essentially independent of flow rate. In particular, the efficiency reached a value of 88% of equilibrium at phase flow rates of 15 gal./min. at a mixing intensity of 250 inches per minutes.

The foregoing description has been concerned largely with one embodiment of the present invention. In a broader aspect the present invention concerns an apparatus and process for contacting two incompletely miscible liquids that possess different densities. The liquids may be either pure chemical compounds or they may be mixtures or solutions of such compounds. For example, one of the liquids presented in the foregoing description was a solution of phenol in kerosene. In addition, one of the liquids is present as a continuous liquid phase and the other liquid as a discontinuous phase.

In accordance with the present invention the two liquids in the form of separate streams are conducted through two separate conduits wherein the liquids flow in the same vertical direction. The two streams are brough together in a third conduit that is also a substantially vertical one, but the flow of the liquids in this common conduit is in a direction that is substantially vertically opposite to that of the streams in the separate conduits. Thus, in entering the third conduit the two streams are actually reserved insofar as their direction of flow is concerned.

The third conduit which is common to both liquids conducts the two liquids to the entrance of an angularly inclined mixing zone which is provided with a suitable mechanical mixer adapted to thoroughly disperse the two liquids. The mixer preferred for this purpose is the perforated plate type of mixer identified earlier.

The mixed liquids pass from the exit of the mixing zone to a settling zone where the liquids are separated into individual layers. It is preferred that the mixture in passing from the mixing zone into the settling zone flow through a venturi type of conduit, since such a device serves to accelerate the separation taking place in the settling zone. It is further preferred that the mixing zone by provided with a conduit adapted to recirculate at least a portion of the continuous phase liquid from the exit of the mixing zone back to the entrance to this zone. In this connection, it will be noted that one of the liquids to be contacted always constitutes a continuous liquid phase through the apparaatus, and that the other liquid constitutes a discontinuous or dispersed phase. Since the flow of each of the liquids through the apparatus is largely governed by the density differential existing between them, it follows that a provision must be made for preventing the continuous phase liquid from by-passing the mixing zone by flowing into the conduit which introduces the discontinuous phase liquid to the mixing zone. The present invention realizes this objective by maintaining a trap or liquid seal in the discontinuous phase liquid conduit immediately prior to the point where this liquid enters the mixing zone. The seal is provided structurally by a weir positioned between the outlet of the discontinuous phase liquid conduit and the inlet to the mixing zone. This weir preferably is of the serrated or notched type, since this type of weir serves to disperse the stream into a plurality of streams and thus improves the distribution of the stream to the mixing zone.

The angular disposition of the mixing zone is important in that it makes possible cross-current mixing of the two liquids. Such mixing is achieved by introducing the heavier liquid at a point near the top of the entrance to the zone and the lighter of the liquids at a point near the bottom of the entrance to the zone.

The present invention as demonstrated is readily adapted to multi-stage tower type of operation by merely superimposing one contacting stage upon the other. A large number of such stages may be used. The flow of the discontinuous phase liquid between the stages is made possible by downcomer conduits provided between the stages. The flow of the discontinuous phase liquid to the mixing zone of each stage is governed by the weir sealing means described above. While the two liquids flow substantially concurrently through each stage, the relative flow between stages is actually countercurrent.

It will be appreciated that many variations may be made in the apparatus and process described hereinbefore without departing from the spirit or scope of the present invention. Thus, a wide variety of pumps, controllers, valves, pipes, tubing, and other structural devices may be employed that are conventionally used by those skilled in the art in connection with liquid-liquid contacting processes and forms of apparatus. Likewise, the present invention may be employed for a vast number of liquid-liquid operations. For example, in the petroleum industry the present invention may readily be adapted to the sulfuric acid treating of petroleum oils, the caustic treating of various fractions, solvent treating and precipitation treating such as deasphalting and deashing. It will be noted that in some instances the continuous phase liquid may be lighter than the discontinuous phase liquid. In this instance, the tower shown in the figure need only be inverted to operate in the manner desired. In other words, the heavier of the two liquids always enters the top of the tower; and the lighter of the two liquids enters the bottom. This follows regardless of which liquid is the continuous phase liquid.

What is claimed is:

1. An apparatus for countercurrently contacting two incompletely miscible liquids having different densities wherein one of the liquids is present as a continuous phase and the other liquid as a discontinuous phase which comprises a vertically disposed tower; a first conduit at the top of the tower to introduce the heavier liquid therein; a second conduit at the bottom of the tower to withdraw the heavier liquid therefrom; a third conduit at the bottom of the tower to introduce the lighter liquid therein; a fourth conduit at the top of the tower to withdraw the lighter liquid therefrom; a plurality of vertically spaced, superposed treating stages in said tower; an angularly inclined, laterally confined mixing zone in each stage with an inlet end and an outlet end; the mixing zones of successive stages being on opposite sides of said tower; mechanical means in each mixing zone adapted to mix said liquids; a horizontally disposed confined settling zone in each stage adapted to separate mixtures of the liquids into separate phase layers; the outlet end of each mixing zone discharging into the entrance of its respective settling zone; the outlet ends of the mixing zones being vertically nearer to the end of the tower where the continuous phase liquid enters the tower than are the inlet ends of the mixing zones; a fifth conduit in each given stage arranged to withdraw the continuous phase liquid from the continuous phase layer in the settling zone of a stage on one side of the given stage and to introduce said continuous phase liquid within the inlet end of the mixing zone of the given stage; a sixth conduit in each given stage arranged to withdraw the discontinuous phase liquid from the discontinuous phase layer in the settling zone of a stage on the opposite side of the given stage and to introduce said discontinuous phase liquid within the inlet end of the mixing zone of the given stage; baffle means in each stage whereby the heavier liquid entering the mixing zone of the stage is directed toward the upper portion of the inlet end of the mixing zone of the stage and the lighter liquid is directed toward the lower portion of the inlet end of the mixing zone; a liquid trap in each said sixth conduit; a weir intermediate the outlet end of each said sixth conduit and the inlet end of the mixing zone in each stage arranged to distribute the discontinuous phase liquid uniformly across the width of the mixing zone; and a seventh conduit in each stage arranged to recycle a portion of the continuous phase liquid from the settling zone of each stage to the inlet end of the mixing zone in the stage.

2. Apparatus as defined in claim 1 in which each mixing zone is inclined at an angle of about 25° to 35° from the horizontal.

3. Apparatus as defined in claim 2 in which the mechanical mixing means in each stage is a vibrating perforated-plate mixer.

4. Apparatus as defined in claim 1 in which each weir is a notch-type weir.

5. Apparatus as defined in claim 1 in which each weir is a V-notch weir.

6. Apparatus as defined in claim 1 in which a venturi-like section is provided between the outlet end of each mixing zone and its respective setttling zone.

References Cited in the file of this patent
UNITED STATES PATENTS

| | | |
|---|---|---|
| 2,266,521 | Van Dijck | Dec. 16, 1941 |
| 2,290,209 | Rosenthal | July 21, 1942 |
| 2,580,010 | Fenske et al. | Dec. 25, 1951 |
| 2,609,276 | Casler et al. | Sept. 2, 1952 |
| 2,642,341 | Bradley | June 16, 1953 |
| 2,667,407 | Fenske et al. | Jan. 26, 1954 |
| 2,710,790 | Rupp et al. | June 14, 1955 |